United States Patent Office 3,032,516
Patented May 1, 1962

3,032,516
ACRYLAMIDE FOAM FORMING COMPOSITION
AND METHOD OF FORMING A FOAM THEREOF
Herbert Burkhard, Harrison, N.Y., and George H. Dorion, New Canaan, Conn., assignors to American Cyanamid Company, New York, N.Y., a corporation of Maine
No Drawing. Filed May 18, 1960, Ser. No. 29,800
10 Claims. (Cl. 260—2.5)

This invention relates to a new useful method of forming gelled foams. More particularly, the invention relates to a new method of forming gelled aqueous foams and foamed rubber from aqueous emulsions containing a foam forming material and the desired natural or synthetic rubber latex compositions which are to be formed into a foam.

The invention further includes the gelled aqueous foams themselves.

Still further, the invention includes a composition which is not foamed, but contains the aqueous foam forming material and the incorporated emulsified latex.

Prior to the present invention, foaming resins, such as synthetic and natural rubber latex emulsions, could be prepared by use of a detergent which would stabilize the resinous foam during the actual formation of the foam. The foam would be gelled by coagulation of the emulsion particles by removal of the surface active agent. The current practice is to use sodium silcofluoride, which, as the pH is dropped, causes the detergent to diminish in size droplets until all the particles are joined in a continuous network. It follows that the maintaining of the proper pH is necessary and that hydrolysis problems will also be involved. Furthermore, the gelling time of the foamed composition is contingent on the rate of pH variation and could not be controlled independently thereof. Also, some synthetic latex emulsions apparently are basically incompatible with and do not satisfactorily react in the presence of sodium silicofluoride.

Through the use of the present invention, the gelling time is substantially independent of the pH or temperature of the resinous material; since the foam forming material and gelling material are separate from the rubber foam forming components and only act as a vehicle for putting the rubber latex in a foamed condition and since it is not necessary to remove or decrease the detergents, it is possible to have a stable foam of (1) an unpolymerized mixture of reactants so that they may be subsequently polymerized at leisure while in the foamed state and without need of varying pH or heat or (2) a partially polymerized mixture which can be further cross-linked by, say, a curing agent.

The invention may be described briefly as follows: To an aqueous solution of a mixture of an acrylamide and an alkylidene bisacrylamide and a small amount of N,N,N',N'-tetramethyl ethylene diamine is added a water-soluble persulfate catalyst; the solution is then foamed in any suitable agitating device, such as a Waring Blendor. Upon the formation of the foam, the solution is poured into a mold, whereupon it gels into a stable form without the aid of heat or any further treatment. If desired, up to 94% of the resin emulsion, such as latex emulsion, can be incorporated with the aforementioned foam forming solution, whereupon a stable gel foam of an uncured, polymerized or unpolymerized resin mixture is formed. The stable foam has an indefinite stability and may be utilized in many various ways.

The basic foam forming composition contains (1) an acrylamide; (2) an alkylidene bisacrylamide having the formula:

(A) 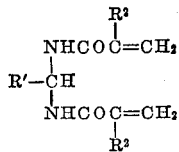

in which

is a hydrocarbon residue of an aldehyde and $R^2$ is a member of the group consisting of hydrogen and a methyl radical; (3) a water-soluble persulfate catalyst; (4) N,N,N',N'-tetramethyl ethylene diamine and (5) the emulsifying system which consists of dioctyl sodium sulfosuccinate used in conjunction with stearamido propyl dimethyl 2-hydroxyl ethyl ammonium nitrate. The order of mixing these components is not essential nor is the order in which they are mixed with the other components of the system. The persulfate catalyst is normally added last, just prior to use, so as to preclude premature gelation.

In addition to acrylamide itself, which is the preferred monomer for component (1) of the system, methacrylamide and N-methylol acrylamide may also be employed and consequently acrylamide as employed herein contemplates the inclusion also of methacrylamide and N-methylol acrylamide. In addition to an acrylamide the polymerizable system may contain as much as 80%, based on the weight of the acrylamide, of various compounds to the extent that the latter are soluble in water. Illustrative of suitable comonomeric compounds of this type are such as aluminum acrylate, acrylic acid, methacrylic acid, acrylonitrile, methacrylamide, and water-soluble salts of acrylic acid, such as sodium acrylate, potassium acrylate, and the like. In general, the concentration of the acrylamide monomer in aqueous solution may vary from about 3% to about 20% by weight, although the preferred range is from about 5 to about 15 weight percent. As component (2) any of the alkylidene bisacrylamides corresponding to the above formula (A), which are described and claimed in Lundberg Patent No. 2,475,846, or mixtures thereof may be used as cross-linking agents in addition to the comonomer N,N'-methylene bisacrylamide set out in the examples hereinafter. Only slight solubility is required of the alkylidene bisacrylamide in view of the small amount used; therefore, this component may have a water solubility as low as about 0.02% by weight at 20° C. but a solubility of at least about 0.10% is more desirable for general purposes. Conversion of the polymerizable material to the water-insoluble condition is brought about by vinyl type polymerization and covalent cross-linking with the bisacrylamide. From about 1% up to about 10% by weight based on the polymerizable material of the alkylidene bisacrylamide cross-linking agent (II) may be employed, although preferred results are generally derived when amounts of from about 2% to about 8% are used.

The polymerization reaction according to the invention is activated by employing a water-soluble persulfate. This is the third component of the polymerizable system. Water-soluble persulfates are well known to those skilled in the art. These include compounds such as ammonium persulfate, potassium persulfate, sodium persulfate, and the like.

N,N,N',N'-tetramethyl ethylene diamine is the fourth component of the system. Although, as noted above, amines in catalyst systems have been employed heretofore, the use of N,N,N',N'-tetramethyl ethylene diamine as shown more specifically by way of examples hereinafter, provides a unique, unexpected, highly advantageous and efficient result not provided by other amines. N,N,-

N',N'-tetramethyl ethylene diamine offers at least the following advantages: (1) A substantially smaller amount of N,N,N',N'-tetramethyl ethylene diamine is needed for a given polymerization reaction. (2) The amine is applicable over a fairly wide pH range extending from about pH 5 to about pH 12. (3) In the region of pH 5 to pH 7 where most amines lose their catalytic efficiency due to salt formation, N,N,N',N'-tetramethyl ethylene diamine retains very substantial catalytic activity.

The composition of the aqueous foam solution can be varied over a wide range. The basic polymerizable materials which includes a polyacrylamide and a compound represented by Formula A can be present in amounts ranging from 2.5% by weight of water to 44%, the upper limit being the maximum amount which can be solubilized. The preferred range, however, is between 5 and 15%. Anything higher tends to stiffen the gel. The emulsifying agents, dioctyl sodium sulfosuccinate and stearamido propyl dimethyl 2-hydroxyl ethyl ammonium nitrate, are used in a weight ratio of not more than 1:2 and may be added individually in amounts ranging from between 0.1% to about 10%, based on the total weight of the emulsion. Amounts of more than 10% are operative, but are excessive. In general the catalyst components which comprise a water soluble persulfate, such as ammonium persulfate and N,N,N',N'-tetramethyl ethylene diamine, are used in amounts falling within the range of 0.5% to 2.5% by weight of the total weight of the emulsion.

When a rubber latex emulsion is employed with the aqueous foam forming solution, the rubber latex material may be present in amounts up to 60% by weight of solids. The rubber latex materials which may be used in conjunction with the aqueous foam forming agent, include most of the elastomeric materials which can be polymerized from an emulsified medium, examples of which include elastomers, such as butadiene/styrene copolymers, neoprene polymers and copolymers, butadiene/acrylonitrile copolymers, and other similar diolefin/monolefin copolymers.

The aqueous foam forming material is compatible with any latex emulsion and the fact that latex emulsions can be made using different emulsifiers has proved to be of no consequence.

The preparation of the various latex emulsions which can be employed in the present invention is generally carried out by blending the elastomer forming material with a certain amount of soap or other emulsifier, catalyst and a promoter in about 1½ to 2 times as much water measured as parts by weight. Great latitude may be exercised in determining the composition of the latex. There are many standard formulations of butadiene/styrene latices which are made up and sold directly from the manufacturer. These standard latices are sold under various code numbers which have significance in that each code number is keyed with certain standard specifications established in part by the U.S. Office of Synthetic Rubber. Other latices are usually prepared in a manner well known to those skilled in the art. Various preparations and theory of latex emulsion preparations may be found in Witby et al., Synthetic Resins, John Wiley & Sons, Inc., New York, N.Y. (1954), and Bovey et al., Emulsion Polymerization, Interscience Publishers, Inc., New York, N.Y. (1955).

Natural rubber latex is usually obtained commercially as a 60% solution which is reduced in concentration for various applications.

As can be seen, this invention is essentially different from the present methods of gelling latex foams. Our invention causes gel formation in the water present in the foam by an indepenednt organic polymerization process, which is in contrast with the sodium silicofluoride method which requires an inorganic colloidal gel formation.

The foams obtained by way of the instant invention are usually considered as high density type foams which range in densities of from 0.5 to 0.9 gram per cubic centimeter.

In addition to the making of foam rubber these aqueous foams may be used as applicators to severe wounds, to stop bleeding and also aid in the formation of films, coatings, etc. The aqueous foam forming material may also be used in extinguishing fires especially where an inert gas is used to bring about the foaming action.

In order to illustrate the present invention, without any intention of limiting the scope thereof, the following examples are given; unless otherwise stated all parts are by weight.

*Example I*

A solution containing 7.5 parts of a 19 to 1 mixture of acrylamide and methylene bisacrylamide, 0.5 part of dioctyl sodium sulfosuccinate, 1.2 parts of stearamido propyl dimethyl 2-hydroxyl ethyl ammonium nitrate, and 0.8 part of N,N,N',N'-tetramethyl ethylene diamine is placed in a Waring Blendor and is agitated for 0.1 minute. One part of ammonium persulfate is then added and the solution is agitated again for an additional 0.5 minute. The foam is poured into a beaker and gelled within 2–4 minutes. Said reaction takes place in a suitable vessel.

*Example II*

An emulsion containing 4 parts of a 19 to 1 mixture of acrylamide and methylene bisacrylamide, 0.2 part of dioctyl sodium sulfosuccinate, 0.8 part of stearamido propyl dimethyl 2-hydroxyl ethyl ammonium nitrate, 75 parts of a butadiene-styrene latex, having the following specifications:

|  | Min. | Max. | Typical |
|---|---|---|---|
| Total Solids, percent | 60 | 63 | 62.2 |
| Residual Styrene, percent | | 0.10 | 0.02 |
| pH | 9.5 | 10.5 | 10.3 |
| Coagulum on 80 Mesh Screen, percent | | 0.14 | 0.05 |
| Mooney, ML 4 at 212° F | 125 | 155 | 140 |
| Bound Styrene, percent | 23.0 | 27.0 | 26.0 |
| Viscosity at 62 percent T.S., cps | | | 1,000 |
| Specific Gravity of Latex, 25°/25° | | | 0.98 |

1 part N,N,N',N'-tetramethyl ethylene diamine and 0.8 part ammonium persulfate is treated as in Example I.

*Example III*

An emulsion containing 5.1 parts of a 19 to 1 mixture of acrylamide and methylene bisacrylamide, 0.77 part N,N,N',N'-tetramethyl ethylene diamine, 0.82 part stearamido propyl dimethyl 2-hydroxyl ethyl ammonium nitrate, 0.21 part dioctyl sodium sulfosuccinate, 77 parts of a 60% natural latex emulsion and 0.41 part of ammonium persulfate is agitated as above and then poured into a spherical mold of 2⅛" diameter. After gelation a ball is obtained which had a density of 0.74 g./cc. Said reaction takes place in a suitable vessel.

*Example IV*

An emulsion containing 5 parts of a 19 to 1 mixture of acrylamide and methylene bisacrylamide respectively, 0.2 part of dioctyl sodium sulfosuccinate, 0.8 part of stearamido propyl dimethyl-2-hydroxyl ethyl ammonium nitrate, 75 parts of a chloroprene latex, having the following specifications:

| | |
|---|---|
| Solids content, percent | 59 |
| Specific gravity: | |
| As latex | 1.12 |
| As dry chloroprene | 1.23 |
| Initial pH | 10.2 |
| Average limiting viscosity, c.p.s | 33 |

1 part N,N,N',N'-tetramethyl ethylene diamine and 0.5 part ammonium persulfate placed in a suitable vessel and is treated (foamed and gelled) as in Example I.

We claim:
1. A method of forming a foam, which comprises agitating an aqueous solution comprising (1) an acrylamide containing monoethylenic unsaturation, (2) a compound represented by the general formula

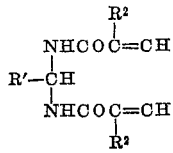

in which

is a hydrocarbon residue of an aldehyde and $R^2$ is a member selected from the group consisting of hydrogen and a methyl radical, (3) a water-soluble persulfate catalyst, (4) N,N,N',N'-tetramethyl ethylene diamine and (5) at least 0.1% of dioctyl sodium sulfosuccinate and stearamido propyl dimethyl 2-hydroxyl ethyl ammonium nitrate, respectively.

2. A method such as set forth in claim 1, wherein the said aqueous solution is mixed with a rubber latex emulsion.

3. A method such as set forth in claim 2 wherein said latex emulsion is natural latex.

4. A method such as set forth in claim 2 wherein said latex is a butadiene/styrene latex.

5. A method such as set forth in claim 2 wherein said latex is a chloroprene latex.

6. A foam prepared by the method of claim 1.

7. A foam forming composition comprising (1) an acrylamide containing monoethylenic unsaturation, (2) a compound represented by the general formula:

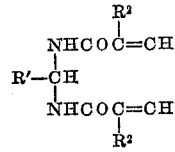

in which

is a hydrocarbon residue of an aldehyde and $R^2$ is a member selected from the group consisting of hydrogen and a methyl radical, (3) a water-soluble persulfate catalyst, (4) N,N,N',N'-tetramethyl ethylene diamine, (5) at least 0.1% of dioctyl sodium sulfosuccinate and stearamido propyl dimethyl 2-hydroxyl ethyl ammonium nitrate and (6) a rubber latex emulsion, respectively.

8. The foam forming composition of claim 7 wherein the rubber latex is natural latex.

9. The foam forming composition of claim 7 wherein the rubber latex is a butadiene/styrene latex.

10. The foam forming composition of claim 7 wherein the rubber latex is a chloroprene latex.

No references cited.